(12) United States Patent
Thable et al.

(10) Patent No.: US 9,126,670 B2
(45) Date of Patent: Sep. 8, 2015

(54) PANEL ASSEMBLY AND METHOD OF MAKING THE SAME

(75) Inventors: Gagan Thable, Winnipeg (CA); Michael A. Baschak, Winnipeg (CA); Rudy Braun, Winnipeg (CA); Marc Storozuk, Winnipeg (CA)

(73) Assignee: The Boeing Company, Chicago, IL (US)

( * ) Notice: Subject to any disclaimer, the term of this patent is extended or adjusted under 35 U.S.C. 154(b) by 1013 days.

(21) Appl. No.: 13/249,249

(22) Filed: Sep. 30, 2011

(65) Prior Publication Data

US 2013/0084422 A1    Apr. 4, 2013

(51) Int. Cl.
| B64C 1/12 | (2006.01) |
| B64G 1/00 | (2006.01) |
| B61D 17/04 | (2006.01) |
| B62D 27/02 | (2006.01) |
| B63B 3/68 | (2006.01) |
| B64C 1/06 | (2006.01) |
| B64C 1/00 | (2006.01) |

(52) U.S. Cl.
CPC . *B64C 1/069* (2013.01); *B64C 1/12* (2013.01); *B64C 2001/0081* (2013.01); *Y02T 50/42* (2013.01); *Y10T 29/49622* (2015.01); *Y10T 428/24322* (2015.01); *Y10T 428/24752* (2015.01)

(58) Field of Classification Search
CPC .................................. B64C 1/069; B64C 1/12
USPC ......... 244/119, 130, 131, 132, 158.1; 114/84; 403/380; 296/191; 105/396; 428/189
See application file for complete search history.

(56) References Cited

U.S. PATENT DOCUMENTS

| 578,239 A * | 3/1897 | House .............................. 114/84 |
| 7,155,865 B2 * | 1/2007 | Rosenberg ..................... 52/79.9 |
| 8,039,115 B2 * | 10/2011 | Hackius et al. ............... 428/615 |
| 2007/0016336 A1 | 1/2007 | Chapin, II | |
| 2009/0064681 A1 | 3/2009 | Keith et al. | |

(Continued)

FOREIGN PATENT DOCUMENTS

| CN | 2307862 Y | 2/1999 |
| DE | 20018289 U1 | 1/2001 |

(Continued)

OTHER PUBLICATIONS

PCT International Preliminary Report on Patentability and Written Opinion of the International Searching Authority for Counterpart International Application No. PCT/US2012/052259, Mailed Apr. 10, 2014, Applicant The Boeing Company, 10 pages.

(Continued)

*Primary Examiner* — Rob Swiatek

(57) ABSTRACT

In an embodiment of the disclosure, there is provided a panel assembly for joining to a structure and method of making the same. The assembly has a first panel element having at least one first panel nonlinear edge, and has a second panel element having at least one second panel nonlinear edge, wherein the second panel nonlinear edge is designed to interlace with the first panel nonlinear edge to form a panel assembly with interlaced panel edgebands for joining to a structure. A width of the interlaced panel edgebands is reduced as compared to a width of adjacent panel edgebands formed by adjacent panel elements having linear edges, and the reduced width results in an overall reduced weight of the panel assembly and the structure to which the panel assembly is joined.

21 Claims, 12 Drawing Sheets

(56) References Cited

U.S. PATENT DOCUMENTS

| | | | |
|---|---|---|---|
| 2009/0078820 A1 | 3/2009 | Lin et al. | |
| 2009/0166473 A1 | 7/2009 | Zuniga Sagredo | |
| 2009/0184200 A1 | 7/2009 | Lin et al. | |
| 2010/0224729 A1* | 9/2010 | Lieven | 244/129.3 |

FOREIGN PATENT DOCUMENTS

| | | |
|---|---|---|
| DE | 20018289 U1 | 1/2001 |
| RU | 2164990 C1 | 4/2001 |
| WO | 2011003222 A1 | 1/2011 |
| WO | 2011003222 A1 | 1/2011 |

OTHER PUBLICATIONS

PCT International Search Report and Written Opinion of the International Searching Authority for Counterpart International Application No. PCT/US2012/052259, ISR Mailed May 14, 2013, Applicant The Boeing Company, 11 pages.

PCT International Search Report and Written Opinion of the International Searching Authority for Related CIP Counterpart International Application No. PCT/US2012/052707, ISR Mailed May 14, 2013, Applicant The Boeing Company, 11 pages.

The State Intellectual Property Office of P.R.C., Notification of First Office Action and Search Report, issued Mar. 31, 2015, for Counterpart Chinese Patent Application No. 2012800482412, based on PCT/US2012/052259, Applicant The Boeing Company, 9 pages.

* cited by examiner

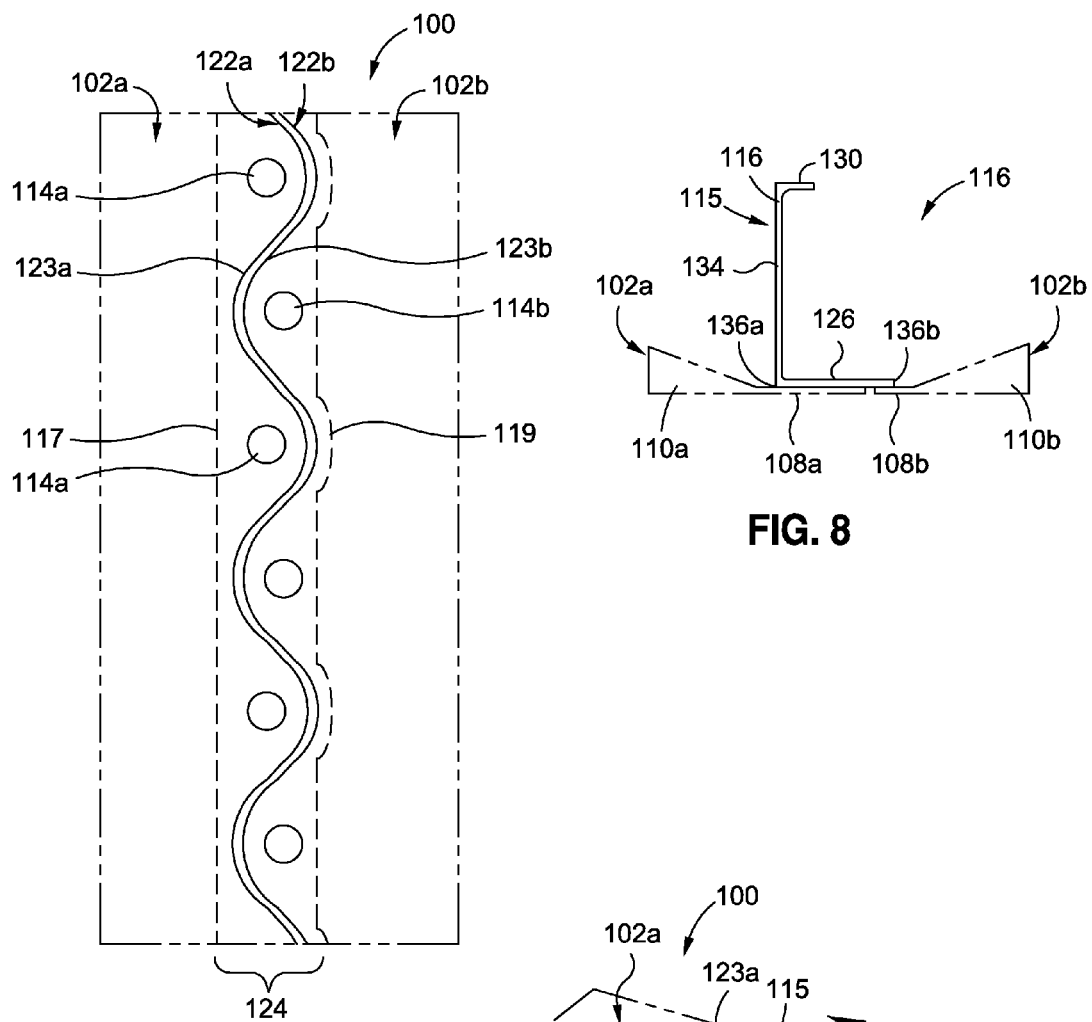
FIG. 6
FIG. 8
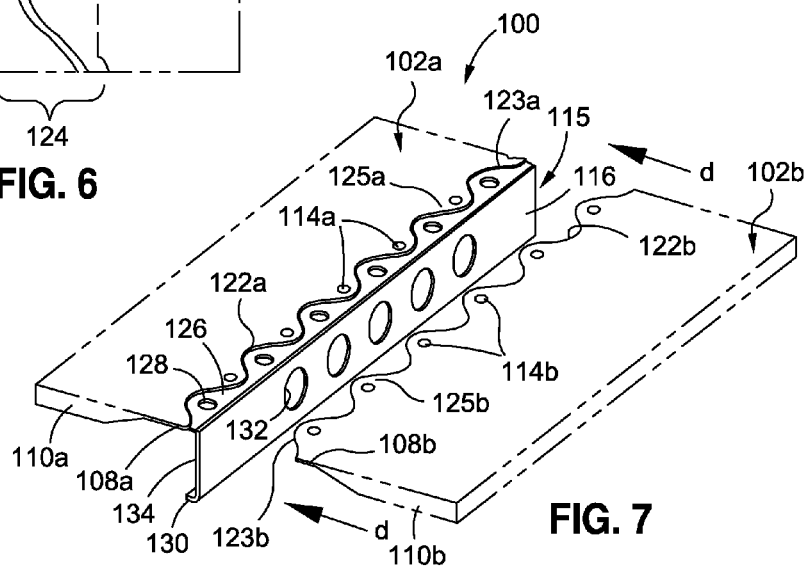
FIG. 7

PANEL ASSEMBLY AND METHOD OF MAKING THE SAME

BACKGROUND

1) Field of the Disclosure

The disclosure relates generally to panel assemblies for attachment to structures, and more particularly, to panel assemblies having unique edgebands for attachment to structural frames of vehicles, such as aircraft, and other structures.

2) Description of Related Art

In many applications, panels may be assembled by mechanically fastening the panels together with one or more rows of fasteners, such as rivets, bolts, screws, or other fasteners, by chemically bonding the panels together with an adhesive or another chemical bonding element, or by another means of joining or fastening known in the art. Such panel assemblies may be attached to structural frames or other structures or parts of various transport vehicles, such as aircraft, spacecraft, rotorcraft, watercraft, automobiles, trucks, buses, or other transport vehicles, or of architectural structures such as buildings, bridges, or other structures.

In particular, an aircraft fuselage or body may be manufactured with multiple skin panels mechanically fastened together both circumferentially and longitudinally with rows of fasteners such as metal rivets. Such skin panels may be used to form fairings which are structures to reduce drag and to produce a smooth outline and appearance of the aircraft. Fairings, such as wing-to-body fairings, provide an aerodynamic shell between the wing and the fuselage or body of an aircraft to form the outer skin of the aircraft. Known wing-to-body fairing panel assemblies typically have panels with a linear or straight edge between two adjacent panels attached to an aircraft structural frame.

Illustrations of known wing-to-body fairing panel assemblies are shown in FIGS. 2A-2C and FIGS. 3-4. FIG. 2A is an illustration of an interior side perspective view of a known aircraft wing-to-body fairing panel assembly 30 formed of panel elements 32a, 32b having linear or straight edges 34a, 34b (see also FIG. 2C), respectively. As shown in FIGS. 2A-2C, the panel elements 32a, 32b may have, respectively, sides 36a, 36b that may or may not be attached to further panel elements; edgebands 38a, 38b having an edgeband width 54 (see FIG. 2B) and each edgeband 38a, 38b having one or more rows of panel openings 44a, 44b (see FIG. 2B); honeycomb core portions 40a, 40b with ramped portions 41a, 41b (see FIG. 2A); interior surfaces 50a, 50b (see FIG. 2A); and, exterior surfaces 52a, 52b (see FIG. 2C). The panel elements 32a, 32b may typically be made of composite material and/or metal material, and the edgebands 38a, 38b, although thinner in width than the honeycomb core portions 40a, 40b, typically weigh more than the honeycomb core portions 40a, 40b due to the use of lighter weight material in the honeycomb core portions 40a, 40b and the use of heavier weight material in the edgebands 38a, 38b.

FIG. 2B is an illustration of an interior front perspective view of the known aircraft wing-to-body fairing panel assembly 30 of FIG. 2A. FIG. 2C is an illustration of an exterior perspective view of the known aircraft wing-to-body fairing panel assembly 30 of FIG. 2A. As shown in FIG. 2B, the panel elements 32a, 32b may be joined to first end edges 42a, 42b, having a J-profile 48, of an aircraft structural frame element 46 via frame openings 58a, 58b that correspond to the panel openings 44a, 44b of the panel elements 32a, 32b. The panel elements 32a, 32b are joined to the aircraft structural frame element 46 and, in turn, to each other, via fasteners 56 (see FIGS. 2C, 3) inserted through the panel openings 44a, 44b and corresponding frame openings 58a, 58b.

FIG. 3 is an illustration of a close-up perspective view of an exterior portion of the panel element 32a of the known aircraft wing-to-body fairing panel assembly 30 of FIG. 2A joined to the aircraft structural frame element 46. As shown in FIG. 3, the aircraft structural frame element 46 further has a second end edge 60 and a body 62 with openings 64.

FIG. 4 is an illustration of an interior perspective view of an interface 66 between the two adjacent panel elements 32a, 32b of the known aircraft wing-to-body fairing panel assembly 30 of FIG. 2A. The interface 66 is formed between the linear or straight edges 34a, 34b. The edgeband width 54 is formed between an end 68 of the edgeband 38a and an end 70 of the edgeband 38b.

The use of a double row of fasteners or multiple rows of fasteners in the edgeband width of such known panel assemblies as shown in FIGS. 2A-2C and FIGS. 3-4 may increase the edgeband width, and, in turn, may increase the amount of heavier material that may be used in the edgebands. This may result in an increase in the overall weight of the panel assemblies and the structure to which it is attached. Moreover, the use of a double row of fasteners or multiple rows of fasteners in the edgeband width may increase the number of fasteners needed to assemble the panel assemblies. This may further result in an increase in the overall weight of the panel assemblies and the structure to which it is attached. Finally, with the use of an increased number of fasteners, the cost of manufacturing the panel assemblies may increase due to increased time and labor that may be required to install the fasteners.

Accordingly, there is a need in the art for an improved panel assembly and method of making the same that provide advantages over known assemblies and methods.

SUMMARY

This need for an improved panel assembly and method of making the same is satisfied. As discussed in the below detailed description, embodiments of the improved panel assembly and method may provide significant advantages over known assemblies and methods.

In an embodiment of the disclosure, there is provided a panel assembly for joining to a structure. The assembly comprises a first panel element having at least one first panel nonlinear edge. The assembly further comprises a second panel element having at least one second panel nonlinear edge. The second panel nonlinear edge is designed to interlace with the first panel nonlinear edge to form a panel assembly with interlaced panel edgebands for joining to a structure. A width of the interlaced panel edgebands is reduced as compared to a width of adjacent panel edgebands formed by adjacent panel elements having linear edges, and the reduced width results in an overall reduced weight of the panel assembly and the structure to which the panel assembly is joined.

In another embodiment of the disclosure, there is provided a method of making a panel assembly for joining to a structure. The method comprises fabricating a first panel element having at least one first panel nonlinear edge. The method further comprises fabricating a second panel element having at least one second panel nonlinear edge, wherein the second panel nonlinear edge is designed to interlace with the first panel nonlinear edge. The method further comprises interlacing the first panel nonlinear edge with the second panel nonlinear edge to form a panel assembly with interlaced panel edgebands. The method further comprises joining the interlaced panel edgebands of the panel assembly to a structure. A width of the interlaced panel edgebands is reduced as compared to a width of adjacent panel edgebands formed by adjacent panel elements having linear edges. The reduced width results in an overall reduced weight of the panel assembly and the structure to which the panel assembly is joined.

In another embodiment of the disclosure, there is provided a method of making a scalloped panel assembly for joining to an aircraft. The method comprises fabricating a plurality of panel elements each having at least one scalloped edge comprising a plurality of rounded scalloped projections, wherein each rounded scalloped projection has a panel opening. The method further comprises interlacing the panel elements together such that the at least one scalloped edge of each panel element interlaces and corresponds with at least one adjacent scalloped edge of one or more adjacent panel elements to form a scalloped panel assembly with interlaced scalloped edgebands. The method further comprises joining one or more interlaced scalloped edgebands of the scalloped panel assembly to one or more aircraft structural frame elements. The method further comprises inserting a fastener element through each panel opening and through a corresponding frame opening provided in the aircraft structural frame element in order to fasten the one or more interlaced scalloped edgebands to the one or more aircraft structural frame elements. A width of the interlaced scalloped edgebands is reduced as compared to a width of adjacent panel edgebands formed by adjacent panel elements having linear edges. The reduced width results in an overall reduced weight of the scalloped panel assembly and the one or more aircraft structural frame elements to which the panel assembly is joined.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein:

FIG. 6 is an illustration of an exterior view of one of the embodiments of a panel assembly of the disclosure;

FIG. 7 is an illustration of an exploded perspective view of one of the embodiments of a panel assembly of the disclosure attached to a structural frame element;

FIG. 8 is an illustration of a cross-sectional view of one of the embodiments of a panel assembly of the disclosure attached to a structural frame element;

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

Figure 1:
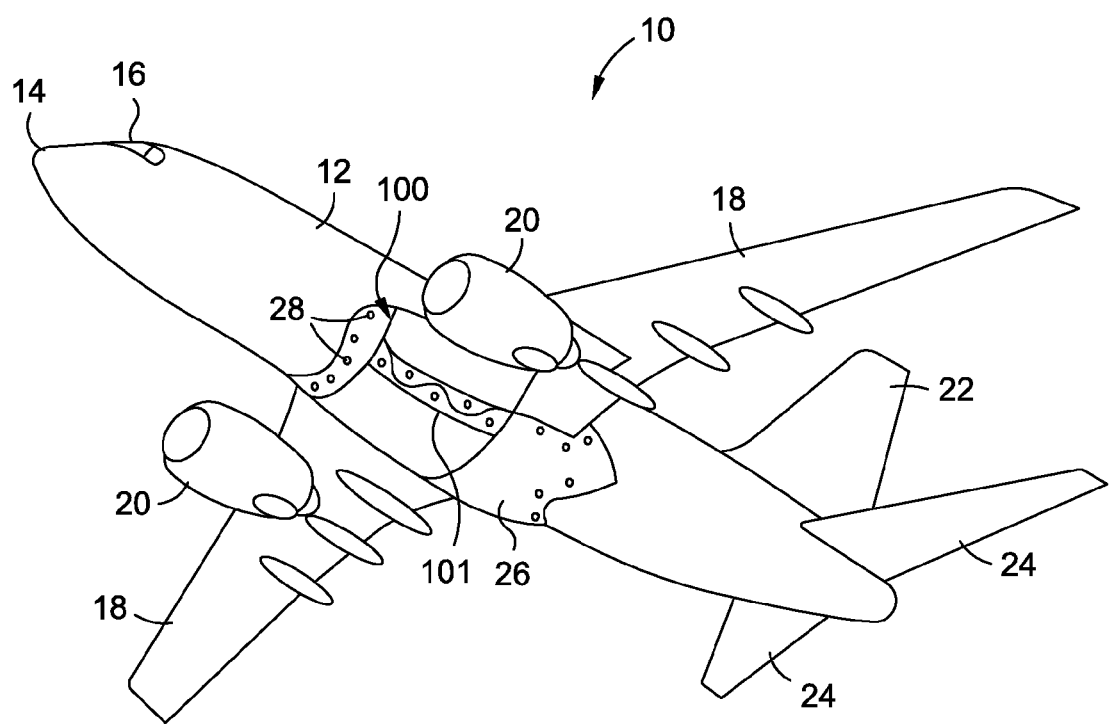
FIG. 1 is an illustration of a perspective view of an exemplary aircraft that may incorporate one or more advantageous embodiments of a panel assembly of the disclosure.

Now referring to the Figures, FIG. 1 is an illustration of a perspective view of an exemplary aircraft 10 that may incorporate one or more advantageous embodiments of a panel assembly 100 (see FIGS. 9A-9C) or a scalloped panel assembly 150 (see FIGS. 11A-11B) of the disclosure. As shown in FIG. 1, the aircraft 10 comprises a fuselage or body 12, a nose 14, a cockpit 16, wings 18 operatively coupled to the fuselage or body 12, one or more propulsion units 20, a tail vertical stabilizer 22, one or more tail horizontal stabilizers 24, and a wing-to-body fairing 26 with fasteners 28. FIG. 1 shows the panel assembly 100 incorporated in the wing-to-body fairing 26. Although the aircraft 10 shown in FIG. 1 is generally representative of a commercial passenger aircraft, the panel assembly 100, as well as the panel assembly 150, may also be employed in other types of aircraft. More specifically, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles. It may also be appreciated that embodiments of the assemblies, methods, and systems in accordance with the disclosure may be utilized in other transport vehicles, such as boats and other watercraft, trains, automobiles, trucks, buses, or other suitable transport vehicles. It may further be appreciated that embodiments of the assemblies, methods, and systems in accordance with the disclosure may be used in various structures where a panel may be attached to a structural element, such as buildings, bridges, or other suitable structures.

Figure 2A:
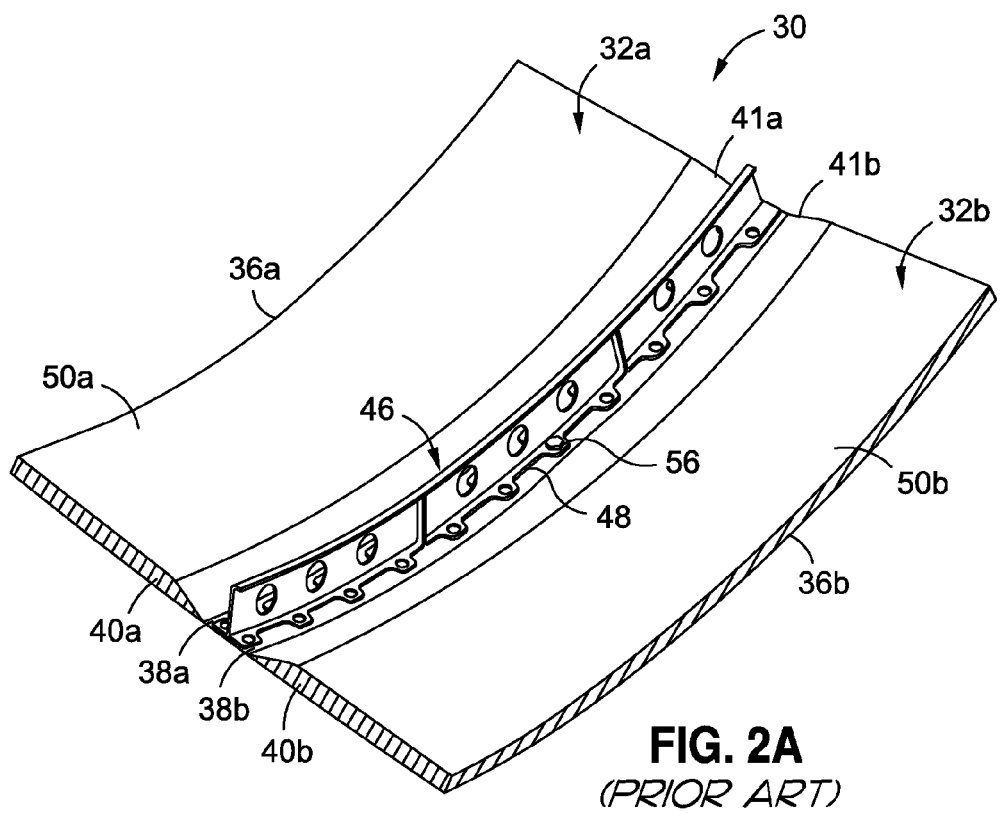
FIG. 2A is an illustration of an interior side perspective view of a known aircraft wing-to-body fairing panel assembly.
Figure 9A:
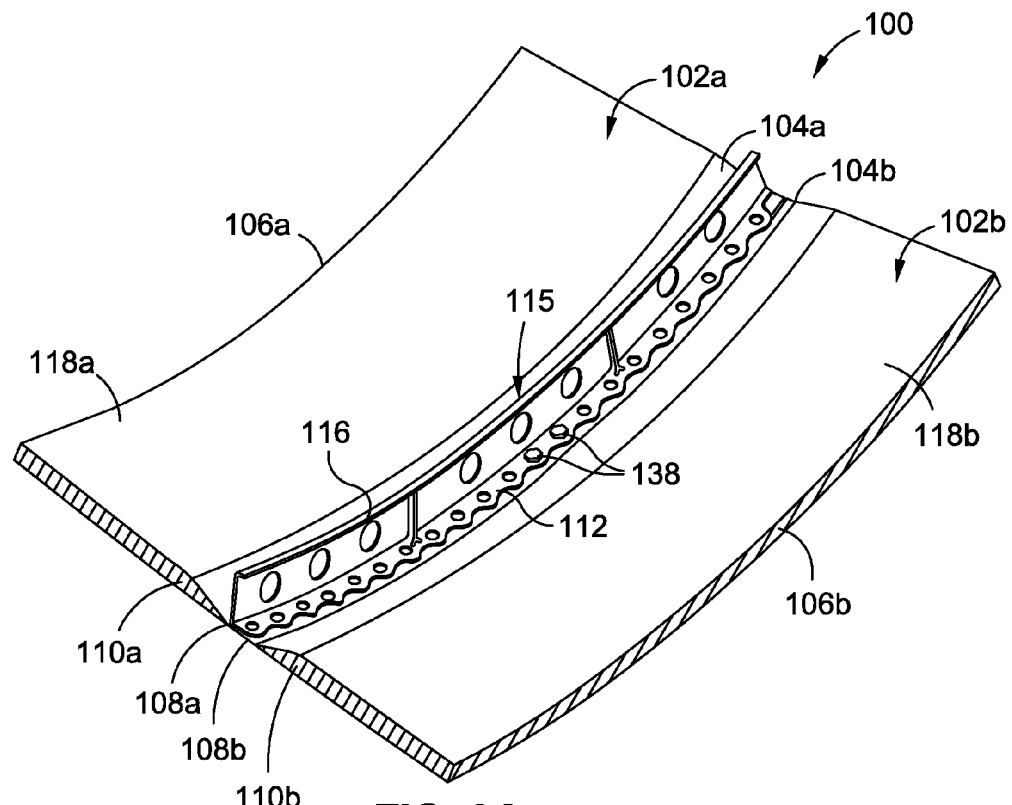
FIG. 9A is an illustration of an interior side perspective view of one of the embodiments of a panel assembly of the disclosure.
Figure 9B:
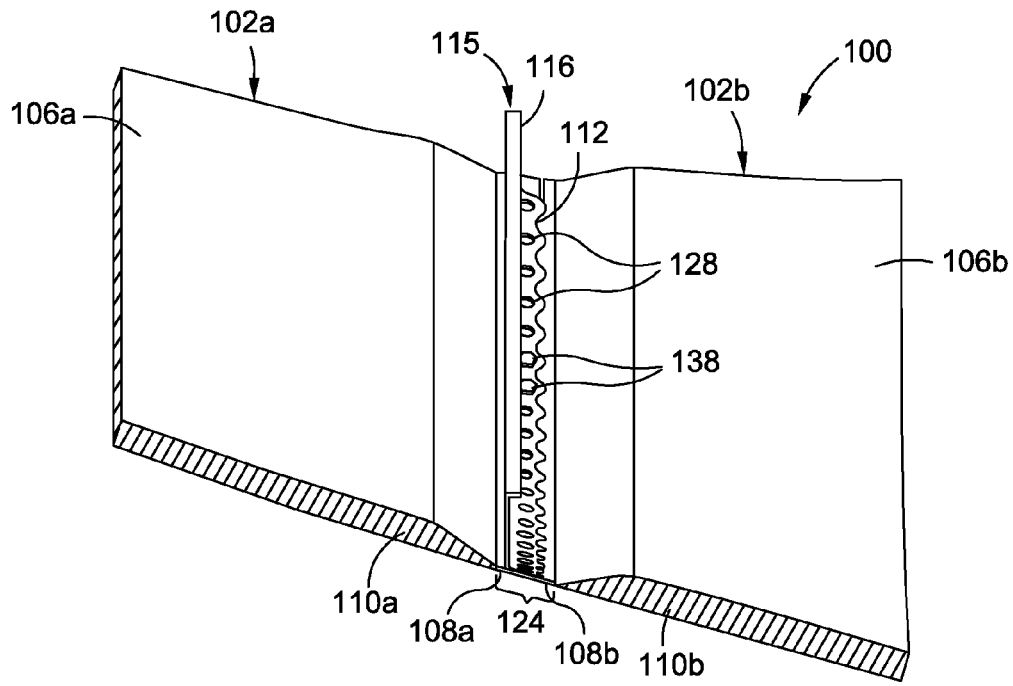
FIG. 9B is an illustration of an interior front perspective view of the panel assembly of FIG. 9A.
Figure 9C:
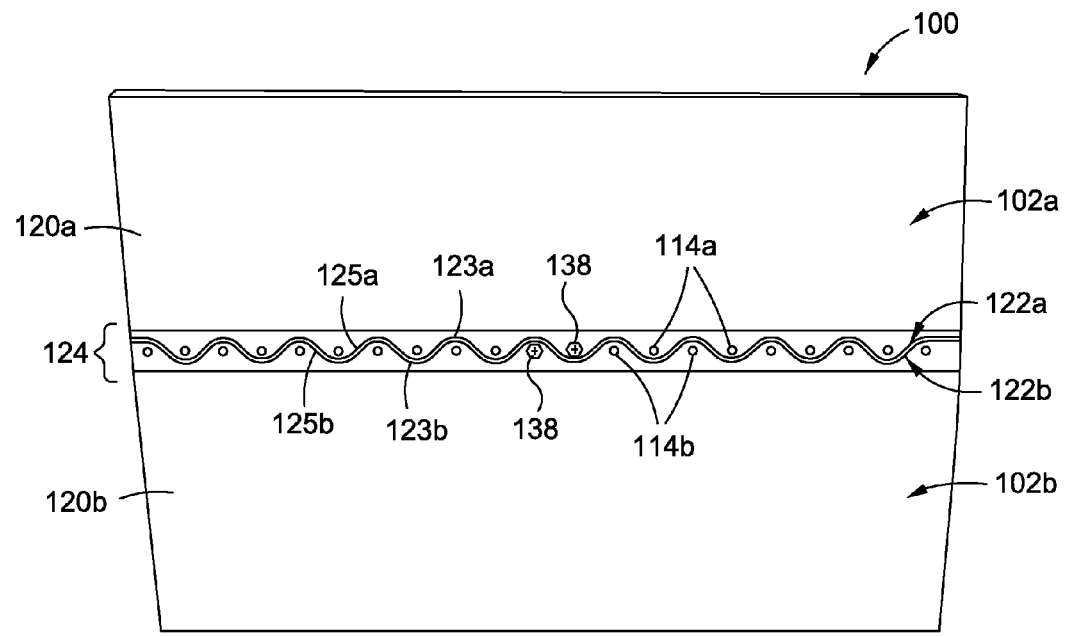
FIG. 9C is an illustration of an exterior perspective view of the panel assembly of FIG. 9A.

As shown in FIGS. 9A-9C, in one of the embodiments there is provided a panel assembly 100 for joining to a structure 115, such as a structural frame element 116. The structural frame element 116 may comprise an aircraft structural frame element 46 (see FIG. 2A). The structure 115 preferably has at least one panelized construction portion 101 (see FIG. 1). The structure 115 may comprise an aircraft 10 (see FIG. 1), a spacecraft, a satellite, a rotorcraft, a watercraft, a boat, a train, an automobile, a truck, a bus, a tractor trailer, a building or other architectural structure, or another suitable structure.

FIG. 9A is an illustration of an interior side perspective view of the panel assembly 100. FIG. 9B is an illustration of an interior front perspective view of the panel assembly 100 of FIG. 9A. FIG. 9C is an illustration of an exterior perspective view of the panel assembly 100 of FIG. 9A. As shown in FIG. 9A, the panel assembly 100 comprises a first panel element 102a having at least one first panel nonlinear edge 122a (see FIG. 9C). The panel assembly 100 further comprises a second panel element 102b having at least one second panel nonlinear edge 122b (see FIG. 9C). As shown in FIG. 9C, the first panel nonlinear edge 122a and the second panel nonlinear edge 122b preferably each have a scalloped or zippered edge configuration 123a, 123b, respectively, comprising a plurality of rounded scalloped projections 125a, 125b. Each rounded scalloped projections 125a, 125b may have panel openings 114a, 114b, respectively.

As shown in FIG. 9A, the first and second panel elements 102a, 102b each comprises a side 106a, 106b, respectively, that may or may not be attached to additional panel elements having nonlinear edges. The first and second panel elements 102a, 102b each further comprises an edgeband 108a, 108b (see FIG. 9A). When the first panel nonlinear edge 122a and the second panel nonlinear edge 122b are interlaced and first and second panel elements 102a, 102b are adjacent to each other, the edgebands 108a, 108b form an edgeband width 124 (see FIGS. 9B, 5). As shown in FIG. 9A, the first and second panel elements 102a, 102b each further comprises core portions 110a, 110b having ramped portions 104a, 104b. The first and second panel elements 102a, 102b each further comprises interior surfaces 118a, 118b (see FIG. 9A), respectively, and exterior surfaces 120a, 120b (see FIG. 9C), respectively.

The first and second panel elements 102a, 102b, may preferably be made of composite material and/or metal material. The edgebands 108a, 108b preferably each have a thinner or smaller width than the core portions 110a, 110b which each have a thicker or greater width. In addition, the edgebands 108a, 108b preferably each have a greater or heavier weight than the core portions 110a, 110b which each have a lesser or lighter weight. Preferably, the core portions 110a, 110b are comprised of a lighter weight material than the edgebands 108a, 108b. Preferably, the edgebands 108a, 108b are comprised of a heavier weight material than the core portions 110a, 110b.

As shown in FIG. 9C, preferably, the edgeband 108a of the first panel element 102a has a plurality of spaced panel openings 114a along the first panel nonlinear edge 122a. Preferably, the edgeband 108b of the second panel element 102b has a plurality of spaced panel openings 114b along the second panel nonlinear edge 122b. When the first panel nonlinear edge 122a is interlaced and joined with the second panel nonlinear edge 122b, the panel openings 114a, 114b are preferably aligned in a substantially in-line pattern 117 (see FIG. 6).

Figure 10:
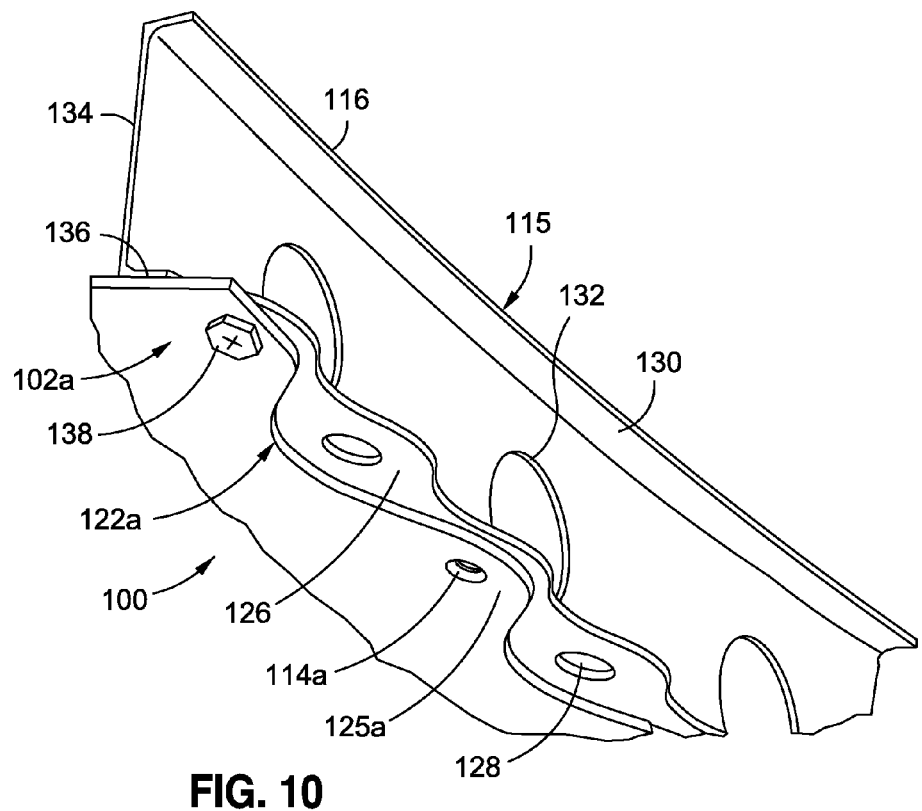
FIG. 10 is an illustration of a close-up perspective view of an exterior portion of one of the panel elements of FIG. 9A attached to a structural frame element.

As shown in FIGS. 9A-9B and FIG. 10, the first and second panel elements 102a, 102b may be joined to the structure 115, such as the structural frame element 116. The structure 115, such as the structural frame element 116, may comprise a first end edge 126 (see FIG. 10) having a C-profile 112 (see FIG. 9A) and having a plurality of frame openings 128. The structure 115, such as the structural frame element 116, may further comprise a second end edge 130 and a body 134 having openings 132. Preferably, the frame openings 128 correspond to the panel openings 114a, 1144b of the panel elements 102a, 102b.

The panel assembly 100 may further comprise a plurality of fastener elements 138 (see FIGS. 9C, 10). The fastener elements 138 may comprise known fastener elements such as rivets, nuts and bolts, screws, or other suitable fastener elements. Each fastener element 138 is configured for insertion through the panel opening 114a, 114b (see FIGS. 9C, 10), respectively, of the first and second panel elements 102a, 102b. Each fastener element 138 is configured for further insertion through a corresponding frame opening 128 (see FIG. 10) provided in the first end edge 126 of the structure 115, such as the structural frame element 116. FIG. 10 is an illustration of a close-up perspective view of an exterior portion of the first panel element 102a of FIG. 9A attached to the first end edge 126 of the structure 115, such as the structural frame element 116, at attachment interface 136a. The first and second panel elements 102a, 102b are joined to the structure 115, such as the structural frame element 116, via fastener elements 138 (see FIGS. 9C, 10) inserted through the panel openings 114a, 114b and the corresponding frame openings 128. As shown in FIG. 9C, when the edgebands 108a, 108b of the first and second panel elements 102a, 102b, respectively, are interlaced together, the fastener elements 138 may be inserted through panel openings 114a, 114b and through frame openings 128 to join or attach the first and second panel elements 102a, 102b to the structure 115, such as the structural frame element 116, and, in turn, to join or attach the first and second panel elements 102a, 102b, to each other. Alternatively, instead of fastener elements 138, the panel assembly 100 may be joined to the structure 115 via an adhesive or other chemical bonding element or other suitable fastening mechanism.

FIG. 7 is an illustration of an exploded perspective view of one of the embodiments of the panel assembly 100 of the disclosure attached to the structure 115, such as the structural frame element 116. As shown in FIG. 7, the second panel element 102b is shown separated from the first panel element 102a which is shown attached to the structure 115, such as the structural frame element 116. FIG. 8 is an illustration of a cross-sectional view of the structural frame element 116 attached at attachment interfaces 136a, 136b to the edgebands 108a, 108b, respectively, of the first and second panel elements 102a, 102b, respectively. As shown in FIG. 8, the edgeband 108a of the first panel element 102a is attached to the first end edge 126 of the structure 115, such as the structural frame element 116, at attachment interface 136a, and the edgeband 108b of the second panel element 102b is attached to the first end edge 126 of the structure 115, such as the structural frame element 116, at attachment interface 136b.

Figure 4:
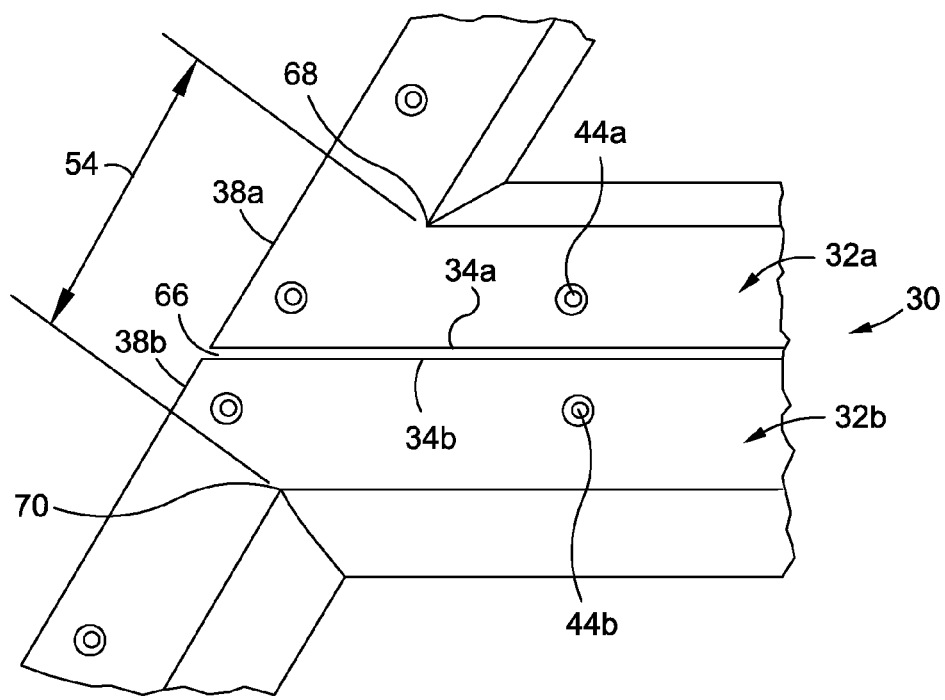
FIG. 4 is an illustration of an interior perspective view of an interface of panel elements of the known aircraft wing-to-body fairing panel assembly of FIG. 2A.

The panel assembly 100 disclosed herein preferably has an overall reduced fastener element count of fastener elements 138 that may be used to fasten the interlaced panel edgebands 108a, 108b of the first and second panel elements 102a, 102b to the structure 115 as compared to an overall fastener element count that may be used to fasten adjacent panel edgebands 38a, 38b (see FIG. 4) formed by adjacent panel elements 32a, 32b having linear edges 34a, 34b (see FIG. 4). The reduced fastener element count of the panel assembly 100 preferably results in a further overall reduced weight of the panel assembly 100 and the structure 115 to which the panel assembly 200 is joined.

Figure 5:
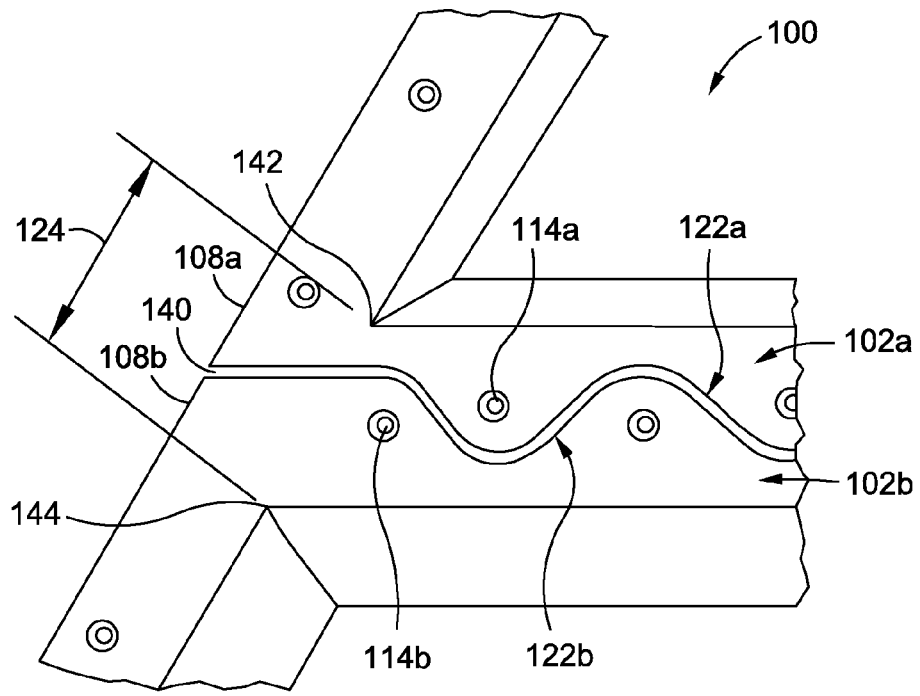
FIG. 5 is an illustration of an interior perspective view of an interface of panel elements of one of the embodiments of a panel assembly of the disclosure.

FIG. 5 is an illustration of an interior perspective view of an interface 140 formed between the first panel nonlinear edge 122*a* and the second panel nonlinear edge 122*b* of the first panel element 102*a*, and the second panel element 102*b*, respectively. The second panel nonlinear edge 122*b* is designed to interlace with the first panel nonlinear edge 122*a* to form the panel assembly 100 with edgebands 108*a*, 108*b* that are interlaced for joining to the structure 115 (see FIG. 9A). FIG. 5 shows the edgebands 108*a*, 108*b* interlaced together to form the edgeband width 124 which may comprise a solid laminate interface area when the first and second panel elements 102*a*, 102*b* are comprised of composite material. The edgeband width 124 is formed between an end 142 of the edgeband 108*a* and an end 144 of the edgeband 108*b*. The edgeband width 124 of the panel edgebands 108*a*, 108*b* that are interlaced together is preferably reduced as compared to an edgeband width 54 (see FIG. 4) of known adjacent edgebands 38*a*, 38*b* (see FIG. 4) formed by known adjacent panel elements 32*a*, 32*b* (see FIG. 4) having linear edges 34*a*, 34*b* (see FIG. 4). The reduced edgeband width 124 preferably results in an overall reduced weight of the panel assembly 100, and when joined or attached to the structure 115 (see FIG. 9A), preferably results in an overall reduced weight of the joined or attached panel assembly 100 and structure 115.

FIG. 6 is an illustration of an exterior view of one of the embodiments of the panel assembly 100 of the disclosure showing an interlaced panel edgeband profile 119 formed between the first panel nonlinear edge 122*a* and the second panel nonlinear edge 122*b* of the first panel element 102*a*, and the second panel element 102*b*, respectively. FIG. 6 further shows the substantially in-line pattern 117 of the panel openings 114*a*, 114*b* when the first panel nonlinear edge 122*a* is interlaced and joined with the second panel nonlinear edge 122*b*.

Figure 11A:
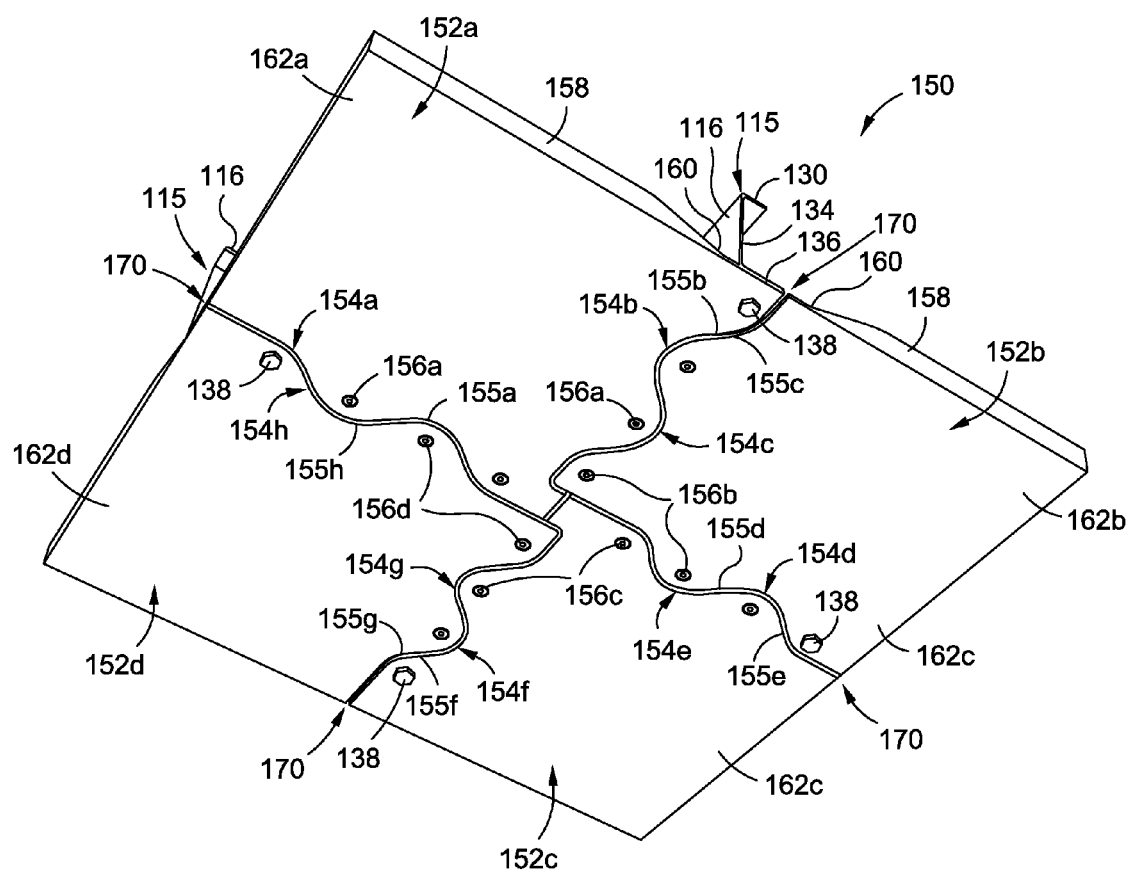
FIG. 11A is an illustration of an exterior perspective view of another embodiment of a panel assembly of the disclosure showing four interlaced panel elements.
Figure 11B:
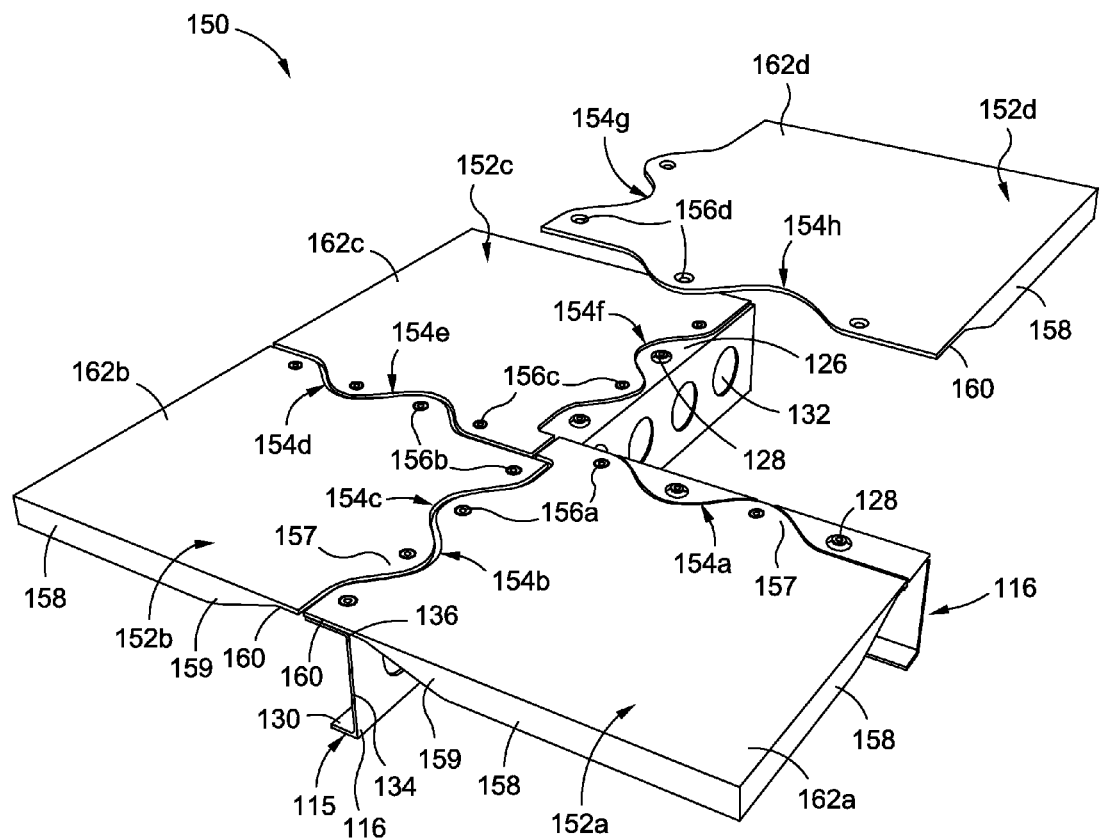
FIG. 11B is an illustration of an exterior perspective view of the panel assembly of FIG. 11A with one panel element disconnected.
Figure 11C:
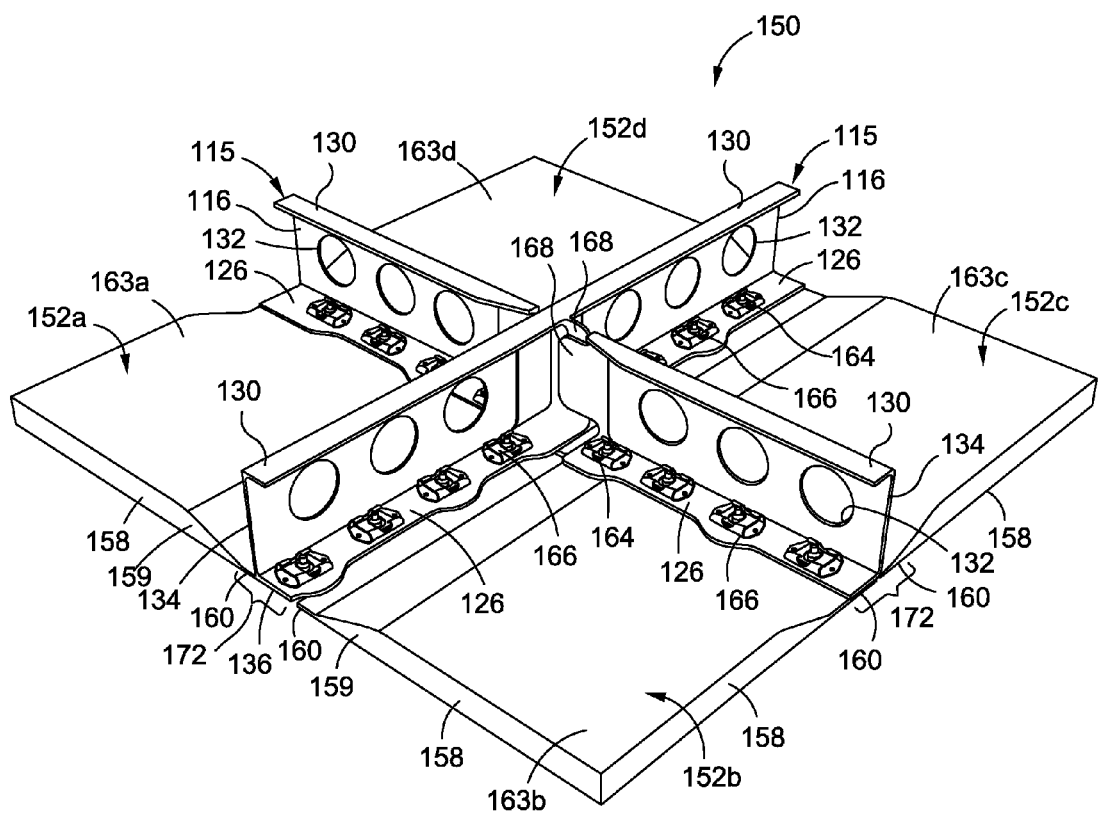
FIG. 11C is an illustration of an interior perspective view of the panel assembly of FIG. 11A.

As shown in FIGS. 11A-11C, in another embodiment of the disclosure, there is provided a scalloped panel assembly 150 comprising four panel elements 152*a*, 152*b*, 152*c*, 152*d* each having at least one nonlinear edge 154*a*-154*h*. As shown in FIG. 11A, panel element 152*a* comprises nonlinear edge 154*a* and nonlinear edge 154*b*. Panel element 152*b* comprises nonlinear edge 154*c* and nonlinear edge 154*d*. Panel element 152*c* comprises nonlinear edge 154*e* and nonlinear edge 154*f*. Panel element 152*d* comprises nonlinear edge 154*g* and nonlinear edge 154*h*. Preferably, the nonlinear edges 154*a*-154*h* each have a scalloped or zippered edge configuration 155*a*, 155*b*, 155*c*, 155*d*, 155*e*, 155*f*, 155*g*, 155*h*, respectively.

FIG. 11A is an illustration of an exterior perspective view of the scalloped panel assembly 150 showing the four panel elements 152*a*, 152*b*, 152*c*, 152*d* that are interlaced together. As shown in FIG. 11A, nonlinear edge 154*a* is interlaced with nonlinear edge 154*h*, nonlinear edge 154*b* is interlaced with nonlinear edge 154*c*, nonlinear edge 154*d* is interlaced with nonlinear edge 154*e*, and nonlinear edge 154*f* is interlaced with nonlinear edge 154*g*. The four panel elements 152*a*-152*d* interlace together at interfaces 170 (see FIG. 11A). When the nonlinear edges 154*a*-154*h* are interlaced and panel elements 152*a*-152*d* are adjacent each other, the edgebands 160 of adjacent panel elements 152*a*-152*d* form an edgeband width 172 (see FIG. 11C).

Each panel element 152*a*-152*d* further comprises a plurality of panel openings 156*a*, 156*b*, 156*c*, 156*d*, respectively, that are configured to receive fastener elements 138 (see FIG. 11A). As discussed above, the fastener elements 138 may comprise known fastener elements such as rivets, nuts and bolts, screws, or other suitable fastener elements. Alternatively, instead of fastener elements 138, the panel assembly 100 may be joined to the structure 115 via an adhesive or other chemical bonding element or other suitable fastening mechanism. Each panel element 152*a*-152*d* further comprises core portions 158 having ramped portions 159 (see FIG. 11B) and edgebands 160. Each panel element 152*a*-152*d* further comprises exterior surfaces 162*a*, 162*b*, 162*c*, and 162*d* (see FIGS. 11A-11B) and interior surfaces 163*a*, 163*b*, 163*c*, and 163*d* (see FIG. 11C).

As shown in FIG. 11A, the scalloped panel assembly 150 is preferably joined or attached to structure 115 at attachment interface 136. As shown in FIGS. 11A-11B, the structure 115 may comprise one or more structural frame elements 116, each comprising a first end edge 126, a second end edge 130, and a body 134 having openings 132.

FIG. 11B is an illustration of an exterior perspective view of the exterior surfaces 162*a*-162*d* of the scalloped panel assembly 150 of FIG. 11A with one panel element 152*d* disconnected from the other panel elements 152*a*, 152*b*, 152*c*. The structure 115 comprising structural frame elements 116 is shown. Each structural frame element 116 comprises first end edge 126, second end edge 130, and body 134 having openings 132.

FIG. 11C is an illustration of an interior perspective view of the interior surfaces 163*a*-163*d* of the scalloped panel assembly 150 of FIG. 11A. As shown in FIG. 11C, the scalloped panel assembly 150 is preferably joined or attached to structure 115 at attachment interface 136. As shown in FIG. 11C, the structure 115 comprises multiple structural frame elements 116. The structural frame elements 116 may be attached to the edgebands 160 of the panel elements 152*a*-152*d* via a plurality of fastener elements 138 (see FIG. 11A). The fastener elements 138 may be secured with attachment elements 164. Preferably, the attachment elements 164 comprise fittings 166 configured to anchor and hold the fastener elements 138 in place against the first end edge 126 of the structural frame element 116. As further shown in FIG. 11C, one or more structural frame elements 116 may be continuous or undivided along the edgebands 160 of the panel elements. Alternatively, as shown in FIG. 11C, one or more structural frame elements 116 may be divided or split into two or more frame element pieces 168 that may attach on each side of the continuous structural frame element 116.

In other embodiments, the panel assembly may comprise more than four panel elements where each panel element may have one or more nonlinear edge that is configured to interlace and join together with a nonlinear edge of adjacent panel elements.

Figure 12:
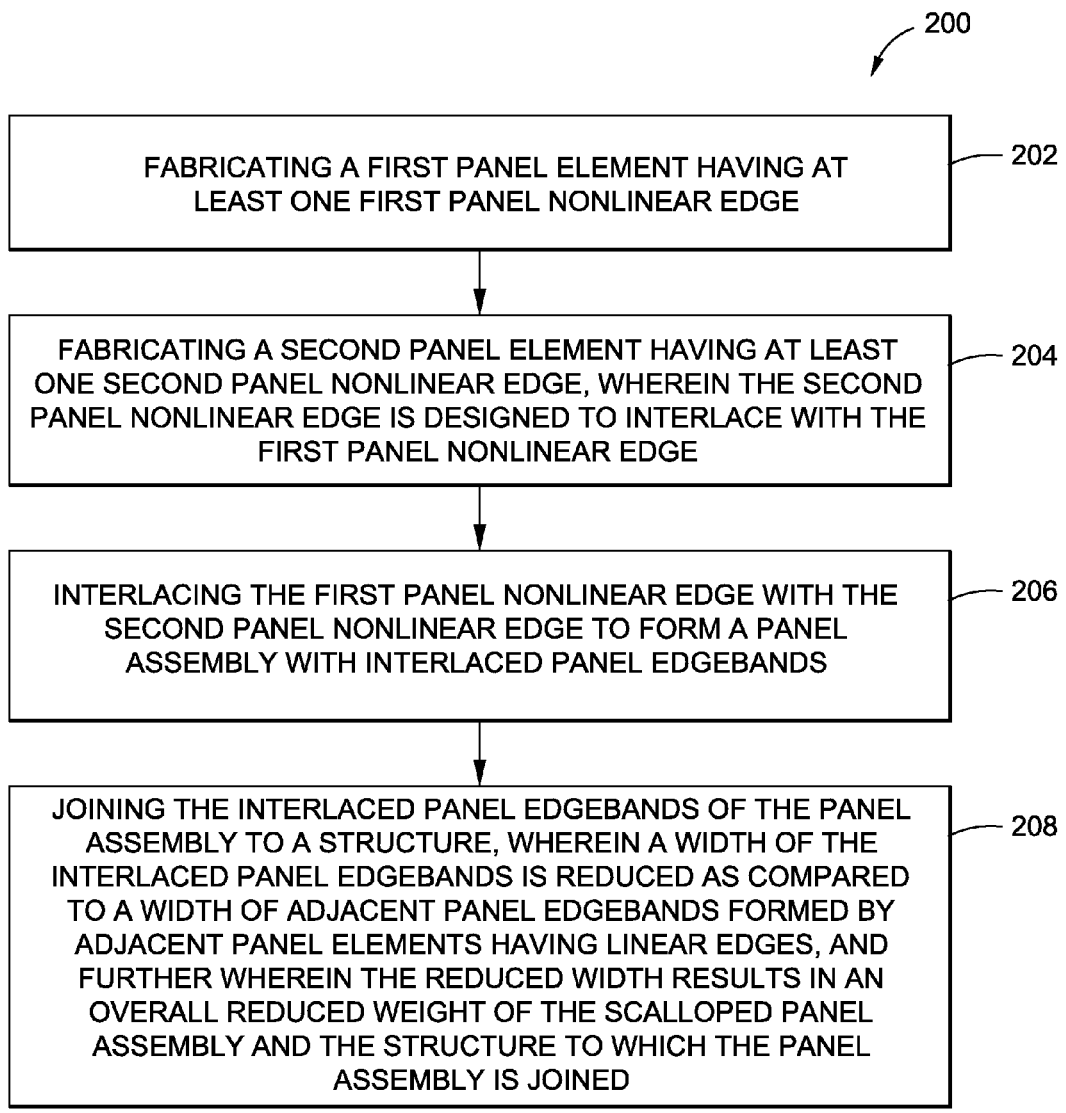
FIG. 12 is an illustration of a flow diagram of an exemplary embodiment of a method of the disclosure; and, FIG. 13 is an illustration of a flow diagram of another exemplary embodiment of a method of the disclosure.

In another embodiment of the disclosure, there is provided a method 200 of making a panel assembly 100 (see FIG. 9A) for joining to a structure 115 (see FIG. 9A), such as a structural frame element 116 (see FIG. 9A). The structural frame element 116 may comprise an aircraft structural frame element 46 (see FIG. 2A). FIG. 12 is an illustration of a flow diagram of an exemplary embodiment of the method 200 of the disclosure. The structure 115 preferably has at least one panelized construction portion 101 (see FIG. 1) and may comprise an aircraft 10 (see FIG. 1), a spacecraft, a satellite, a rotorcraft, a watercraft, a boat, a train, an automobile, a truck, a bus, a tractor trailer, a building, and an architectural structure, or another suitable structure.

As shown in FIG. 12, the method 200 comprises step 202 of fabricating a first panel element 102*a* (see FIG. 9A) having at least one first panel nonlinear edge 122*a* (see FIG. 9C). The method 200 further comprises step 204 of fabricating a second panel element 102b having at least one second panel nonlinear edge 122b. The second panel nonlinear edge 122b is preferably designed to interlace with the first panel nonlinear edge 122a. The first and second panel elements 102a, 102b are fabricated using panel fabrication processes known in the art.

As shown in FIG. 12, the method 200 further comprises step 206 of interlacing the first panel nonlinear edge 122a with the second panel nonlinear edge 122b to form a panel assembly 100 (see FIG. 9C) with interlaced panel edgebands 108a, 108b (see FIG. 6).

As shown in FIG. 12, the method 200 further comprises step 208 of joining the interlaced panel edgebands 108a, 108b of the panel assembly 100 to a structure 115, such as a structural frame element 116 (see FIG. 9B). An edgeband width 124 (see FIG. 5) of the interlaced panel edgebands 108a, 108b is preferably reduced as compared to a width 54 (see FIG. 4) of adjacent panel edgebands 38a, 38b (see FIG. 4) formed by adjacent panel elements 32a, 32b having linear edges 34a, 34b. The reduced edgeband width 124 preferably results in an overall reduced weight of the panel assembly 100, and when the panel assembly 110 is attached to the structure 115, preferably results in an overall reduced weight of the panel assembly 100 and the structure 115.

The method 200 may further comprise fastening the interlaced panel edgebands 108a, 108b to the structure 115 with a plurality of fastener elements 138. The panel assembly 100 disclosed herein preferably has an overall reduced fastener element count of fastener elements 138 that may be used to fasten the interlaced panel edgebands 108a, 108b of the first and second panel elements 102a, 102b to the structure 115, such as the structural frame element 116, as compared to an overall fastener element count that may be used to fasten adjacent panel edgebands 38a, 38b (see FIG. 4) formed by adjacent panel elements 32a, 32b having linear edges 34a, 34b (see FIG. 4). The reduced fastener element count of the panel assembly 100 preferably results in a further overall reduced weight of the panel assembly 100 and the structure 115. Alternatively, instead of fastener elements 138, the panel assembly 100 may be joined to the structure 115 via an adhesive or other chemical bonding element or other suitable fastening mechanism.

Figure 13:
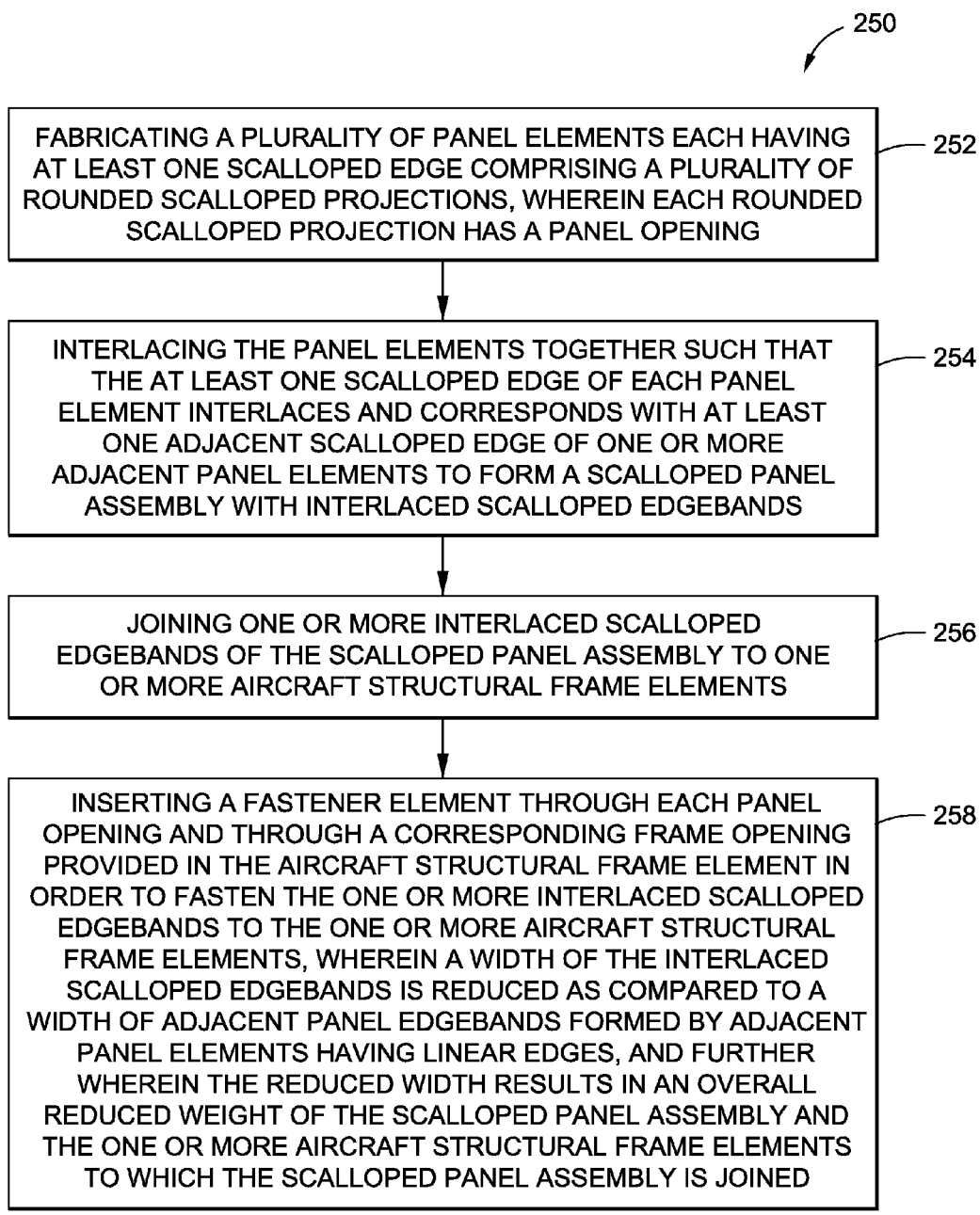

In another embodiment of the disclosure, there is provided a method 250 of making a scalloped panel assembly 150 (see FIGS. 11A-11B) for joining to an aircraft 10 (see FIG. 1). FIG. 13 is an illustration of a flow diagram of an exemplary embodiment of the method 300 of the disclosure. The method 250 comprises step 252 of fabricating a plurality of panel elements 152a-152d (see FIG. 11A), each panel element 152a-152d having at least one nonlinear edge 154a-154h (see FIG. 11A). Preferably, the nonlinear edges 154a-154h each comprise scalloped or zippered edges 155a-155h (see FIG. 11A), respectively, each comprising a plurality of rounded scalloped projections 157. Each rounded scalloped projection 157 preferably has a plurality of fastener openings 156a-156d (see FIG. 11B). The panel element 152a-152d are fabricated using panel fabrication processes known in the art.

The method 250 further comprises step 254 of interlacing the panel elements 152a-152d together such that at least one scalloped or zippered edge 155a-155h of the panel elements 152a-152d interlace and correspond with at least one adjacent scalloped or zippered edge 155a-155h of one or more adjacent panel elements 152a-152d to form a scalloped panel assembly 150 with interlaced scalloped edgebands 160 (see FIG. 11B).

Figure 2B:
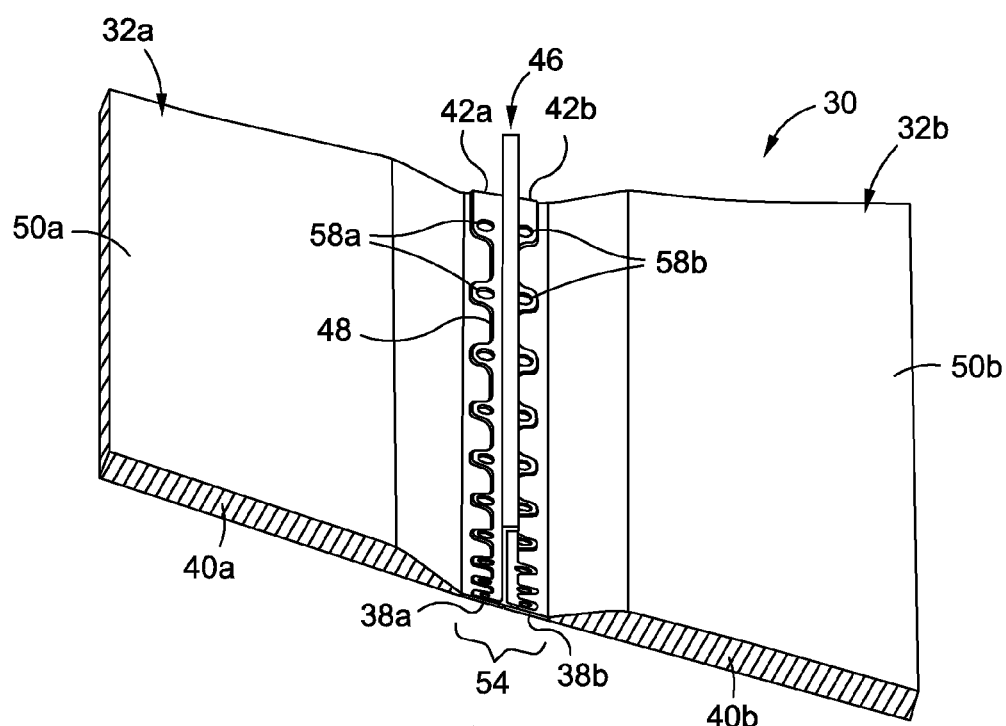
FIG. 2B is an illustration of an interior front perspective view of the known aircraft wing-to-body fairing panel assembly of FIG. 2A.
Figure 2C:
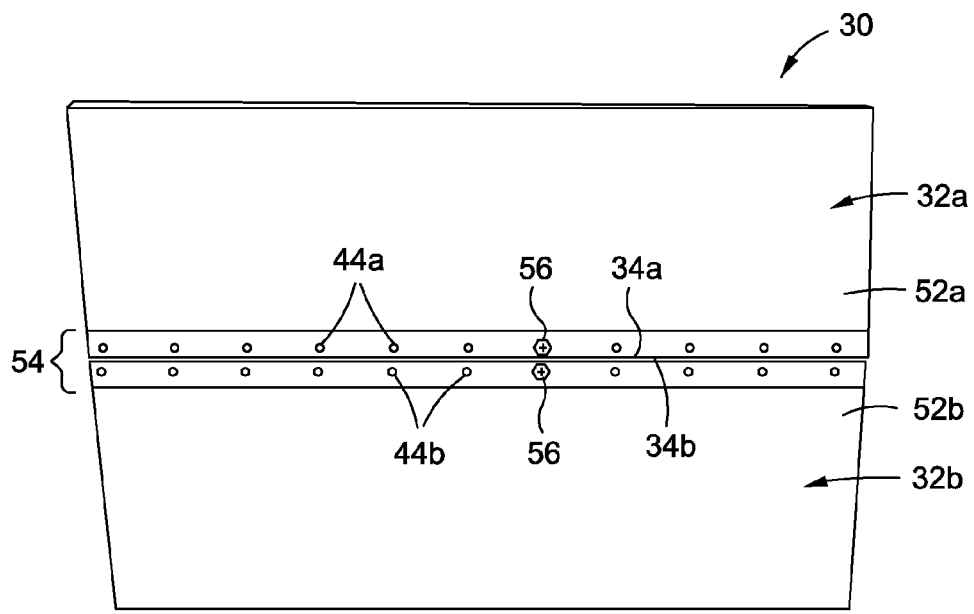
FIG. 2C is an illustration of an exterior perspective view of the known aircraft wing-to-body fairing panel assembly of FIG. 2A.
Figure 3:
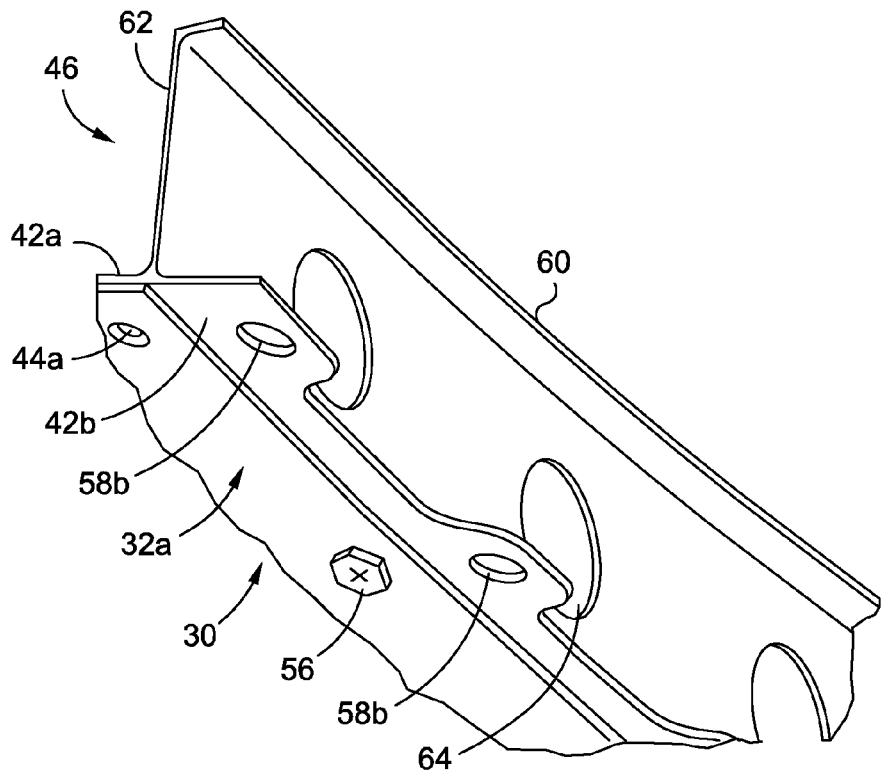
FIG. 3 is an illustration of a close-up perspective view of an exterior portion of one of the known panel elements of FIG. 2A attached to an aircraft structural frame element.

The method 250 further comprises step 256 of joining one or more interlaced scalloped edgebands 160 of the scalloped panel assembly 150 to one or more structures 115, such as structural frame elements 116 (see FIG. 11B), where the structural frame elements 116 preferably comprise aircraft structural frame elements 46 (see FIG. 2B).

The method 250 further comprises step 258 of inserting a fastener element 138 (see FIG. 11A) through each panel opening 156a-156d (see FIG. 11A) and through corresponding frame openings 128, such as, for example, aircraft frame openings, provided in structural frame element 116, such as the aircraft structural frame element 46 (see FIG. 2B) in order to fasten the one or more interlaced scalloped edgebands 160 to the one or more structural frame elements 116, such as aircraft structural frame elements 46. Alternatively, instead of fastener elements 138, the scalloped panel assembly 100 may be joined to the structure 115 via an adhesive or other chemical bonding element or other suitable fastening mechanism.

An edgeband width 172 (see FIG. 11B) of the interlaced scalloped edgebands 160 is preferably reduced as compared to an edgeband width 54 (see FIG. 4) of adjacent panel edgebands 38a, 38b (see FIG. 4) formed by adjacent panel elements 32a, 32b (see FIG. 4) having linear edges 34a, 34b (see FIG. 4). The reduced edgeband width 172 preferably results in an overall reduced weight of the panel assembly 100 and the structure 115, such as the structural frame element 116, preferably comprising one or more aircraft structural frame elements 46.

When the panel scalloped edges are interlaced and joined with the structural frame element 116, preferably comprising one or more aircraft structural frame elements 46, the panel openings 156a-156d in the rounded scalloped projections 157 are preferably aligned in a substantially in-line pattern 117 (see FIG. 6). The scalloped panel assembly 150 preferably has a reduced fastener element count to fasten the one or more interlaced scalloped edgebands 160 to the one or more structural frame elements 116, such as the aircraft structural frame elements 46, as compared to a fastener element count to fasten adjacent panel edgebands 38a, 38b (see FIG. 4) formed by adjacent panel elements 32a, 32b (see FIG. 4) having linear edges 34a, 34b (see FIG. 4). The reduced fastener element count preferably results in a further overall reduced weight of the scalloped panel assembly 150 and the structure 115, such as the structural frame element 116, preferably comprising one or more aircraft structural frame elements 46.

Disclosed embodiments of the panel assemblies 100, 150 and methods 200, 300 provide first and second panel elements 102a, 102b (see FIG. 9A) or panel elements 152a-152d (see FIG. 11A) having edgebands 108a, 108b (see FIG. 9B) or edgebands 160 (see FIG. 11B), respectively, having a scalloped or zippered edge configuration 123a, 123b (see FIG. 9C) or 155a-155h (see FIG. 11A), respectively. Preferably, the panel assemblies 100, 150 may be used in structures having at least one panelized construction portion 101 (see FIG. 1). More preferably, the panel assemblies 100, 150 may be used for wing-to-body fairings 26 (see FIG. 1) on aircraft 10 (see FIG. 1). By scalloping and interlacing the edgebands 108a, 108b (see FIG. 9B) or edgebands 160 (see FIG. 11B) of the first and second panel elements 102a, 102b (see FIG. 9A) or panel elements 152a-152d (see FIG. 11A), respectively, a weight savings for both the panel assemblies and the joined or attached structure may be achieved over known wing-to-body fairing panel configurations having panel elements with linear or straight edges. Further, by using the scalloped or zippered edge configuration 123a, 123b (see FIG. 9C) or 155a-155h (see FIG. 11A), the size of the edgebands 108a, 108b (see FIG. 9B) or edgebands 160 (see FIG. 11B), as well as the thickness of the joint formed between the panel elements, may be reduced, and may thus result in an overall decrease in a solid laminate edgeband area and may also result in an overall reduction in weight of the panel assemblies and the attached structure. The use of first and second panel elements 102a, 102b (see FIG. 9A) or panel elements 152a-152d (see FIG. 11A) having edgebands 108a, 108b (see FIG. 9B) or edgebands 160 (see FIG. 11B), respectively, having a scalloped or zippered edge configuration 123a, 123b (see FIG. 9C) or 155a-155h (see FIG. 11A), respectively, may result in lighter weight panel assemblies and joined or attached structures, for example, lighter weight wing-to-body fairings and lighter weight aircraft. A weight savings may be achieved due to an overall reduction in the solid laminate edgeband area and a corresponding increase in the core portion area or sandwich region or portion of the panel element with a honeycomb core, since the core portion area or sandwich region or portion of the panel element with a honeycomb core weighs less than the solid laminate edgeband area.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting or exhaustive. Although specific terms are employed herein, they are used in a generic and descriptive sense only and not for purposes of limitation.

What is claimed is:

1. A panel assembly joined to a structural frame element, the assembly comprising:
   a first panel element having at least one first panel nonlinear edge attached to the structural frame element; and,
   a second panel element having at least one second panel nonlinear edge attached to the structural frame element, wherein the first panel element and the second panel element each have an edgeband and a core portion, the edgeband having a width that is less than a width of the core portion, and further wherein the first panel nonlinear edge and the second panel nonlinear edge each have a scalloped edge configuration, and the second panel nonlinear edge is designed to interlace with the first panel nonlinear edge to form the panel assembly with interlaced panel edgebands joined to the structural frame element;
   wherein a width of the interlaced panel edgebands is reduced as compared to a width of adjacent panel edgebands formed by adjacent panel elements having linear edges, and further wherein the reduced width results in an overall reduced weight of the panel assembly and the structural frame element to which the panel assembly is joined.

2. The assembly of claim 1 wherein the scalloped edge configuration of the first panel nonlinear edge and the second panel nonlinear edge comprises a plurality of rounded scalloped projections each having a panel opening.

3. The assembly of claim 2 further comprising a plurality of fastener elements, each fastener element configured for insertion through the panel opening and through a corresponding frame opening provided in the structural frame element to attach the interlaced panel edgebands to the structural frame element.

4. The assembly of claim 3 wherein the panel assembly has a reduced fastener element count to fasten the interlaced panel edgebands to the structural frame element, as compared to a fastener element count to fasten the adjacent panel edgebands formed by adjacent panel elements having linear edges, and further wherein the reduced fastener element count results in an overall reduced weight of the panel assembly and the structural frame element.

5. The assembly of claim 1 wherein the first panel element has a plurality of spaced panel openings along the first panel nonlinear edge, and wherein the second panel element has a plurality of spaced panel openings along the second panel nonlinear edge, such that when the first panel nonlinear edge is interlaced and joined with the second panel nonlinear edge, the spaced panel openings of the first and second panel elements are aligned in a substantially in-line pattern.

6. The assembly of claim 1 wherein the structural frame element comprises a single first end edge attached to the first panel element and the second panel element, a second end edge, and a body between the first end edge and the second end edge.

7. The assembly of claim 6 wherein the first end edge has a C-profile.

8. The assembly of claim 1 wherein the structural frame element comprises an aircraft structural frame element and the panel assembly comprises an aircraft wing-to-body fairing panel assembly.

9. The assembly of claim 1 wherein for each of the first panel element and the second panel element, and the edgeband has a weight that is greater than a weight of the core portion.

10. The assembly of claim 1 wherein the panel assembly comprises four or more panel elements interlaced together, each panel element having at least one nonlinear edge.

11. The assembly of claim 1 wherein the panel assembly joined to the structural frame element is incorporated in a structure selected from a group comprising an aircraft, a spacecraft, a satellite, a rotorcraft, a watercraft, a boat, a train, an automobile, a truck, a bus, a tractor trailer, a building, and an architectural structure.

12. A method of making a panel assembly joined to a structural frame element, the method comprising:
   fabricating a first panel element having at least one first panel nonlinear edge attached to the structural frame element;
   fabricating a second panel element having at least one second panel nonlinear edge attached to the structural frame element, wherein the first panel nonlinear edge and the second panel nonlinear edge each have a scalloped edge configuration, and the second panel nonlinear edge is designed to interlace with the first panel nonlinear edge, and further wherein the first panel element and the second panel element each have an edgeband and a core portion, the edgeband having a width that is less than a width of the core portion;
   interlacing the first panel nonlinear edge with the second panel nonlinear edge to form a panel assembly with interlaced panel edgebands; and,
   joining the interlaced panel edgebands of the panel assembly to the structural frame element, the structural frame element having a single first end edge attached to the first panel element and the second panel element, a second end edge, and a body between the first end edge and the second end edge,
   wherein a width of the interlaced panel edgebands is reduced as compared to a width of adjacent panel edgebands formed by adjacent panel elements having linear edges, and further wherein the reduced width results in an overall reduced weight of the panel assembly and the structural frame element to which the panel assembly is joined.

13. The method of claim 12 wherein joining the interlaced panel edgebands to the structural frame element comprises fastening the interlaced panel edgebands to the structural frame element with a plurality of fastener elements.

14. The method of claim 13 wherein the panel assembly has a reduced fastener element count to fasten the interlaced panel edgebands to the structural frame element, as compared to a fastener element count to fasten the adjacent panel edgebands formed by adjacent panel elements having linear edges, and further wherein the reduced fastener element count results in a further overall reduced weight of the panel assembly and the structural frame element.

15. The method of claim 12 wherein the scalloped edge configuration of the first panel nonlinear edge and the second panel nonlinear edge comprises a plurality of rounded scalloped projections each having a panel opening.

16. The method of claim 12 wherein the first panel element has a plurality of spaced panel openings along the first panel nonlinear edge, and wherein the second panel element has a plurality of spaced panel openings along the second panel nonlinear edge, such that when the first panel nonlinear edge is interlaced and joined with the second panel nonlinear edge, the spaced panel openings of the first and second panel elements are aligned in a substantially in-line pattern.

17. The method of claim 12 wherein the structural frame element comprises an aircraft structural frame element and the panel assembly comprises an aircraft wing-to-body fairing panel assembly.

18. The method of claim 12 wherein the panel assembly joined to the structural frame element is incorporated in a structure selected from a group comprising an aircraft, a spacecraft, a satellite, a rotorcraft, a watercraft, a boat, a train, an automobile, a truck, a bus, a tractor trailer, a building, and an architectural structure.

19. A method of making a scalloped panel assembly joined to an aircraft structural frame element of an aircraft, the method comprising:
   fabricating a plurality of panel elements each having at least one scalloped edge comprising a plurality of rounded scalloped projections, wherein each rounded scalloped projection has a panel opening, and further wherein each panel element has an edgeband and a core portion, the edgeband having a width that is less than a width of the core portion, and each panel element is attached to the aircraft structural frame element of the aircraft;
   interlacing the panel elements together such that the at least one scalloped edge of each panel element interlaces and corresponds with at least one adjacent scalloped edge of one or more adjacent panel elements to form a scalloped panel assembly with interlaced scalloped edgebands;
   joining one or more interlaced scalloped edgebands of the scalloped panel assembly to one or more of the aircraft structural frame elements; and,
   inserting a fastener element through each panel opening and through a corresponding frame opening provided in the aircraft structural frame element in order to fasten the one or more interlaced scalloped edgebands to the one or more aircraft structural frame elements,
   wherein a width of the interlaced scalloped edgebands is reduced as compared to a width of adjacent panel edgebands formed by adjacent panel elements having linear edges, and further wherein the reduced width results in an overall reduced weight of the scalloped panel assembly and the one or more aircraft structural frame elements to which the scalloped panel assembly is joined.

20. The method of claim 19 wherein when the scalloped edges of the panel elements are interlaced and joined with the aircraft structural frame elements, the panel openings in the rounded scalloped projections are aligned in a substantially in-line pattern.

21. The method of claim 19 wherein the scalloped panel assembly has a reduced fastener element count to fasten the one or more interlaced scalloped edgebands to the one or more aircraft structural frame elements as compared to a fastener element count to fasten adjacent panel edgebands formed by adjacent panel elements having linear edges, and further wherein the reduced fastener element count results in a further overall reduced weight of the panel assembly and the one or more aircraft structural frame elements.

* * * * *